United States Patent [19]
Park et al.

[11] Patent Number: 5,464,145
[45] Date of Patent: Nov. 7, 1995

[54] HEAT EXCHANGER FOR AUTOMOBILE AIR CONDITIONING SYSTEM AND METHOD FOR MANUFACTURE OF THE SAME

[75] Inventors: Sang-Rok Park, Seoul; Jai-Heung Yoo, Chungcheongnam, both of Rep. of Korea

[73] Assignee: Doowon Climate Control Co., Ltd., Rep. of Korea

[21] Appl. No.: 199,716

[22] Filed: Feb. 22, 1994

[30] Foreign Application Priority Data

Mar. 5, 1993 [KR] Rep. of Korea .................. 93-3355

[51] Int. Cl.$^6$ ............................................. B23K 1/00
[52] U.S. Cl. ...................... 228/183; 228/255; 29/890.052
[58] Field of Search ....................... 228/183, 262.51, 228/56.3, 255; 29/890.052

[56] References Cited

U.S. PATENT DOCUMENTS

| | | | |
|---|---|---|---|
| 3,310,869 | 3/1967 | La Porte et al. | 228/183 X |
| 3,710,473 | 1/1973 | McElwain et al. | 228/183 X |
| 4,032,057 | 6/1977 | Linscott, Jr. | 228/56.3 |
| 4,759,405 | 7/1988 | Metzger | 228/183 X |
| 4,785,092 | 11/1988 | Nanba et al. | 228/261.51 X |
| 4,945,635 | 8/1990 | Nobusue et al. | 29/890.53 |
| 5,052,478 | 10/1991 | Nakajima et al. | 29/890.052 X |
| 5,129,144 | 7/1992 | Halstead et al. | 228/890.054 X |

FOREIGN PATENT DOCUMENTS 765521  1/1957  United Kingdom ............. 29/890.052

*Primary Examiner*—Kenneth J. Ramsey
*Attorney, Agent, or Firm*—Majestic, Parsons, Siebert & Hsue

[57] ABSTRACT

A heat exchanger for an automobile air conditioning system and a method for manufacture of the same. The heat exchanger a plurality of refrigerant flowing tubes, a plurality of corrugated fins sandwiched between the tubes and a pair of header pipes liquid-tightly brazed and jointed to the opposite ends of the tubes respectively. Each of the header pipes is a hollow solid body produced by an extrusion of an aluminum material and having a flat section and a rounded section. The flat section includes a plurality of apertures for receiving the tubes and is thicker than the rounded section. Top and bottom support beams are not only brazed to the outermost corrugated fins but also jointed at their opposite ends to the flat sections of the header pipes. A plurality of brazing beads braze and liquid-tightly joint the opposite ends of the tubes to the first and second header pipes. The brazing beads are formed by melting in a brazing furnace a pair of brazing metal plates respectively interposed between the opposite ends of the tubes and the header pipes. This heat exchanger is prevented from burst, deformation and refrigerant leakage.

4 Claims, 5 Drawing Sheets

HEAT EXCHANGER FOR AUTOMOBILE AIR CONDITIONING SYSTEM AND METHOD FOR MANUFACTURE OF THE SAME

BACKGROUND OF THE INVENTION

1. Field of the Invention

The present invention relates in general to a heat exchanger for an automobile air conditioning system and a method for production of the same and, more particularly, to a heat exchanger free from burst, deformation and refrigerant leakage and a method for manufacture of the same.

2. Description of the Prior Art

U.S. Pat. No. 4,945,635 patented on Aug. 7, 1990 discloses a method of manufacturing brazable pipes and a heat exchanger for an automobile air conditioning system. The heat exchanger for the automobile air conditioning system disclosed in the above U.S. patent is manufactured by rolling a brazing sheet, which is prepared by coating at least one surface of an aluminum core sheet with a brazing substance to form a brazing substance layer on the surface of the core sheet, into a cylinder. The cylinder is, thereafter, provided with a plurality of apertures in its bulged portion for securing ends of their respective flat tubes, thus to provide a cylindrical header pipe, The plurality of apertures of the header pipe are lengthwise spaced out at regular intervals.

In constructing the heat exchanger, the ends of the flat tubes are inserted into the apertures of an opposed pair of cylindrical header pipes, both being prepared by the above-described process. A plurality of corrugated fins are densely sandwiched between the tubes. The outermost corrugated fins, that is, the uppermost and lowermost corrugated fins are respectively provided with top and bottom support beams. The opened opposite ends of each header pipe are blocked by their respective caps. An inlet pipe and an outlet pipe are coupled to the header pipes respectively, thus to provide a provisionally assembled heat exchanger.

The provisionally assembled heat exchanger is, thereafter, placed in a brazing furnace and heated at a high temperature, thus to join the corrugated fins to the tubes and liquid-tightly joint the opposite ends of the tubes to the header pipes. Otherwise stated, the elements of the provisionally assembled heat exchanger are permanently brazed to each other in the brazing furnace such as by the mass brazing, thereby providing a desired heat exchanger.

Here, each cylindrical header pipe is produced by rolling the brazing sheet, which is prepared by coating at least one surface of the aluminum core sheet with the brazing substance to form the brazing substance layer on the surface of the core sheet, into the cylinder. In this case, the brazing sheet is rolled such that its opposite ends are face each other. The opposite ends of the rolled brazing sheet is, thereafter, electrically brazed in order to be butt jointed to each other. The electrically brazed cylinder is, thereafter, pressed at its bulged portion which is spaced apart from the electrically brazed joint, thus to be provided with the plurality of apertures in the bulged portion for securing ends of their respective flat tubes.

However, the above method for manufacturing the heat exchanger for the automobile air conditioning system has a problem that the punching pressure generated in the pressing for provision of the tube receiving apertures for the header pipe is applied to the header pipe and, as a result, may cause burst and deformation of the header pipe at the electrically brazed joint of the header pipe. In order to carry out the pressing for provision of the apertures while preventing the burst and deformation of the header pipe at the electrically brazed joint, the apertures of the header pipe should be punched at positions spaced apart from the electrically brazed joint.

That is, in the above heat exchanger manufacturing method, it is necessarily required to check whether the position at which the tube receiving apertures are to be punched is substantially spaced from the electrically brazed joint of the header pipe. This checking should be attended with waste of much time and productivity deterioration of the heat exchanger production.

In order to overcome the above problem, the tube receiving apertures may be formed by a milling instead of the pressing. However, use of the milling still has a problem in that it necessarily forms burrs about the tube receiving apertures. The burrs formed about the inside periphery of each aperture should be removed from the header pipe with consumption of much labor and much time.

In addition, the opposite ends of the brazing sheet to be butt jointed to each other should be formed to have their respective slanted surfaces. That is, when rolling the brazing sheet coated with the brazing substance at least on one surface thereof into the cylinder, the contact length of the opposite ends of the brazing sheet should be increased and, at the same time, the brazed joint should have the same thickness as that of the other section of the rolled brazing sheet, so that the opposite ends of the brazing sheet should be formed to have the slanted surfaces respectively. The central portion of the brazing sheet is lengthwise pressed so as to give the bulged portion, having a semi-circular cross-section, and left and right horizontal portions shaped like wings. Thereafter, the brazing sheet is pressed at the bulged portion in order to form the tube receiving apertures lengthwise spaced out at regular intervals.

The left and right horizontal portions of the brazing sheet are, thereafter, upwardly forced and vertically bent in order to face each other witch respect to the bulged portion. The slanted ends of the brazing sheet are overlapped with each other and, thereafter, the brazing sheet is rolled into the cylinder. The overlapped portion of the cylinder is brazed in order to provide the cylindrical header pipe.

However, the above method should include different pressing steps and wastes much time and requires waste of money caused by preparation of many press molds. In addition, when rolling the brazing sheet after punching the tube receiving apertures at the bulged portion of the brazing sheet, the apertures may be deformed by the rolling pressure. Another problem of the above method is resided in that there may occur a bad brazing in the brazed joint of the cylindrical header pipe since the overlapped slanted ends of the rolled brazing sheet is brazed in the same brazing furnace at the same time of brazing of the other elements of the provisionally assembled heat exchanger. When there occurs the bad brazing in the brazed joint of the header pipe, a problem of refrigerant leakage through the badly brazed joint of the header pipe is expected.

In other words, in the above method for manufacture of a heat exchanger for an automobile air conditioning system, preparation of the header pipe, which pipe is only an element of the heat exchanger, should be attended with many preparation steps and waste much time. Furthermore, much money should be wasted in preparation of the header pipe since a plurality of different molds are required. The header pipe, coated with the brazing substance at least on one surface thereof and provided with the plurality of tube receiving apertures, further includes the brazed joint which may cause problems of refrigerant leakage, burst and deformation.

SUMMARY OF THE INVENTION

It is, therefore, an object of the present invention to provide a heat exchanger for an automobile air conditioning system in which the aforementioned problems can be overcome and of which a header pipe is integrally manufactured by an extrusion and has a D-shaped cross-section with no joint, thus to simplify its manufacturing process and to be prevented from burst and deformation and to reliably prevent refrigerant leakage.

It is another object of the present invention to provide a method for manufacture of a heat exchanger for an automobile air conditioning system in which a brazing metal plate made of an aluminum thin plate is interposed between ends of a plurality of tubes and an integrated header pipe and heated at a predetermined constant temperature in a brazing furnace in order to be brazed at the same time, thus to simplify the heat exchanger manufacturing process and to reduce manufacturing time as well as manufacturing cost.

In an aspect, the present invention provides a heat exchanger for an automobile air conditioning system comprising: a plurality of refrigerant flowing tubes spaced out at regular intervals and being parallel to each other; a plurality of corrugated fins sandwiched between the tubes in order for increasing a heat exchanging surface; first and second header pipes vertically placed at opposite ends of the tubes and liquid-tightly brazed and jointed to the opposite ends of the tubes respectively such that they communicate with each other through the tubes, each of the first and second header pipes being a hollow solid body produced by an extrusion of an aluminum material and having a flat section and a rounded section integrally extending from opposed sides of the flat section, the flat section including a plurality of apertures for receiving the tubes and being thicker than the rounded section; top and bottom support beams not only brazed to an uppermost one and a lowermost one of the corrugated fins respectively but also jointed at their opposite ends to the flat sections of the first and second header pipes respectively, the top and bottom support beams supporting the corrugated fins in their places; and a plurality of brazing beads for brazing and liquid-tightly jointing the opposite ends of the tubes to the first and second header pipes respectively.

In another aspect, the present invention provides a method for manufacture of a heat exchanger for an automobile air conditioning system comprising the steps of: provisionally inserting opposite ends of a plurality of refrigerant flowing tubes into their respective apertures of first and second D-shaped cross-sectioned header pipes with interposition of a pair of brazing metal plates between them and provisionally coupling opposite ends of top and bottom support beams to the first and second header pipes with interposition of the brazing metal plates, thus to form a provisionally assembled heat exchanger; and heating the provisionally assembled heat exchanger in a brazing furnace at a high temperature so as to melt the brazing metal plates and to form a plurality of brazing beads for liquid-tightly jointing the tubes to the header pipes such that the header pipes communicate with each other through the tubes and for jointing the top and bottom support beams to the header pipes.

BRIEF DESCRIPTION OF THE DRAWINGS

Other objects and aspects of the invention will become apparent front the following description of embodiments with reference to the accompanying drawings in which.

DESCRIPTION OF THE PREFERRED EMBODIMENTS

Figure 1:
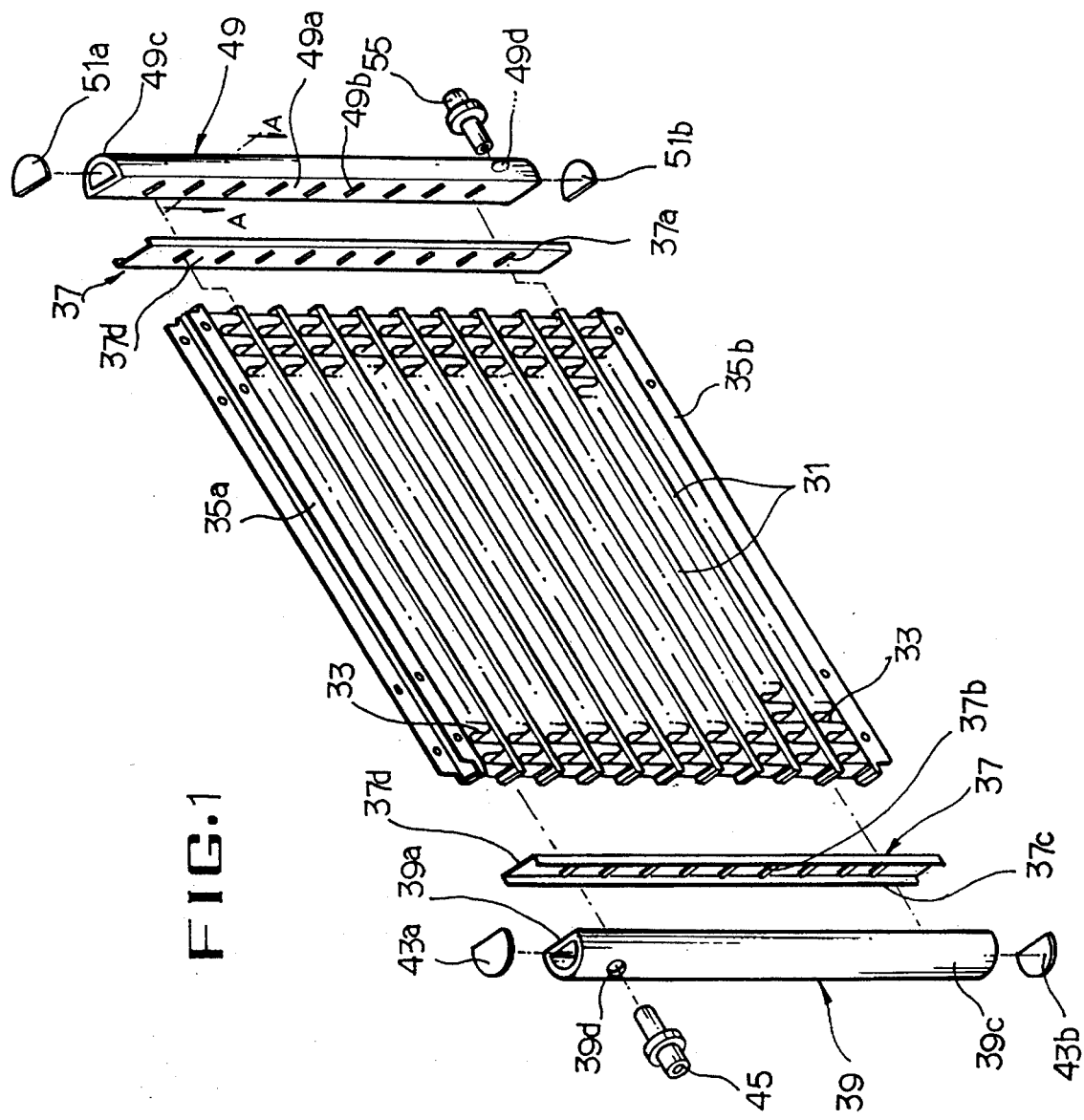
FIG. 1 is an exploded perspective view of a heat exchanger for an automobile air conditioning system in accordance with an embodiment of the present invention.
Figure 2:
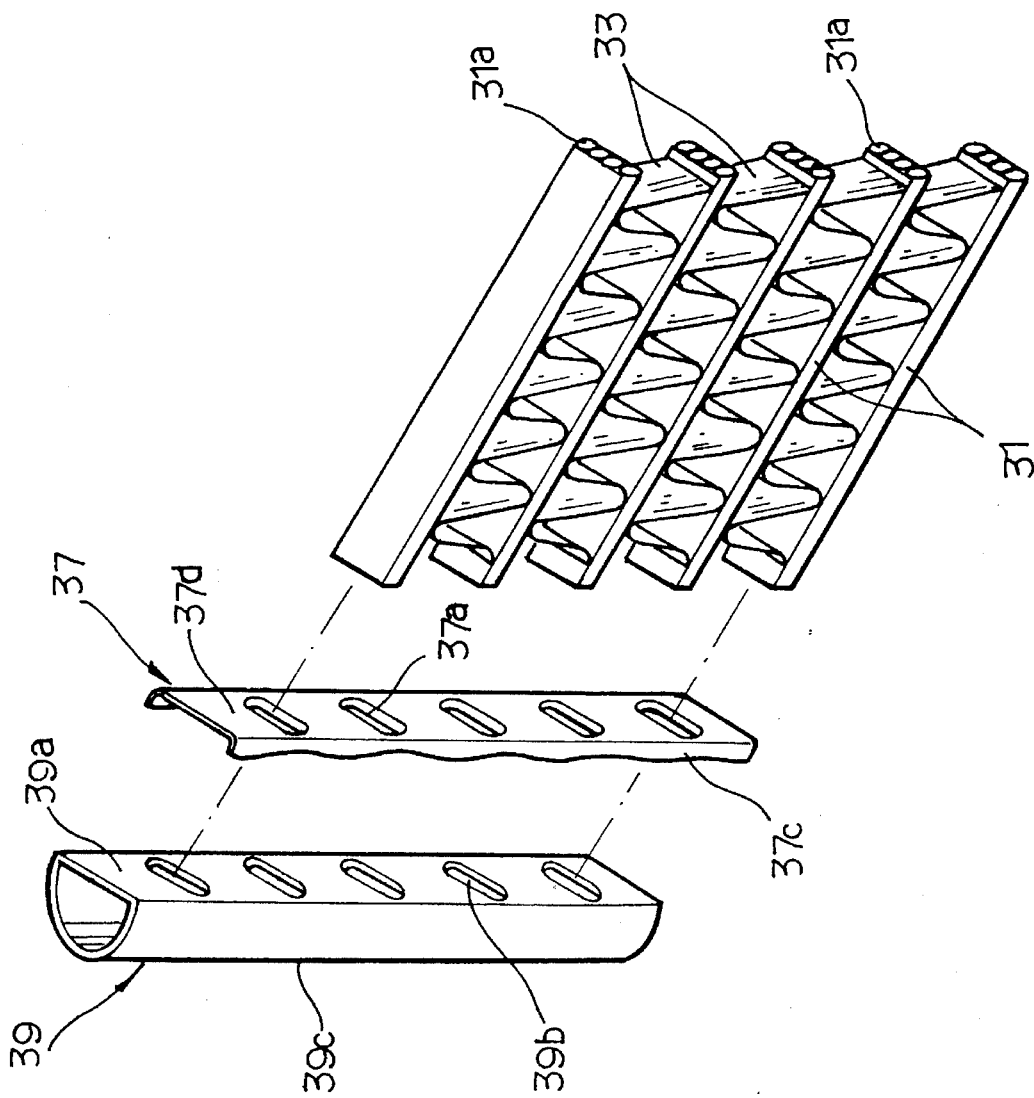
FIG. 2 is an enlarged exploded perspective view of the heat exchanger of FIG. 1, showing a positional interrelation between a header pipe, a plurality of tubes and a brazing metal plate interposed between the header pipe and the tubes.

With reference to FIGS. 1 and 2, there is shown in exploded perspective views a heat exchanger for an automobile air conditioning system in accordance with a primary embodiment of the present invention. In the heat exchanger, a plurality of flat type tubes 31 in which the refrigerant is flow are arranged such that they are parallel to each other. The heat exchanger further includes a plurality of corrugated fins 33 which are densely sandwiched between and brazed to the tubes 31. At the corrugated fins 33, heat exchanging is carried out between the refrigerant flowing in the tubes 31 and the outside air owing to difference between a relatively higher refrigerant temperature and the relatively lower atmospheric temperature, thus to cause the refrigerant temperature to fall.

The outermost corrugated fins, that is, the uppermost corrugated fin 33 and the lowermost corrugated fin 33 are supported by top and bottom support beams 35a and 35b respectively. These support beams 35a and 35b are fixed to the uppermost and lowermost fins 33 and provisionally coupled at their opposed ends to flat sections of first and second header pipes 39 and 40 with interposition of a pair of longitudinal brazing metal plates 37 respectively.

Ends of the tubes 31 directing to the first header pipe 39 penetrate their respective slits 37a (see FIG. 4) of a first brazing metal plate 37 and provisionally inserted into their respective apertures 39b formed on the flat section 39a of the first header pipe 39.

In the same manner, the other ends of the tubes 31 directing to the second header pipe 40 penetrate their respective slits 37a of a second brazing metal plate 37 and provisionally inserted into their respective apertures 40b formed on the flat section 40a of the second header pipe 39.

Figure 3:
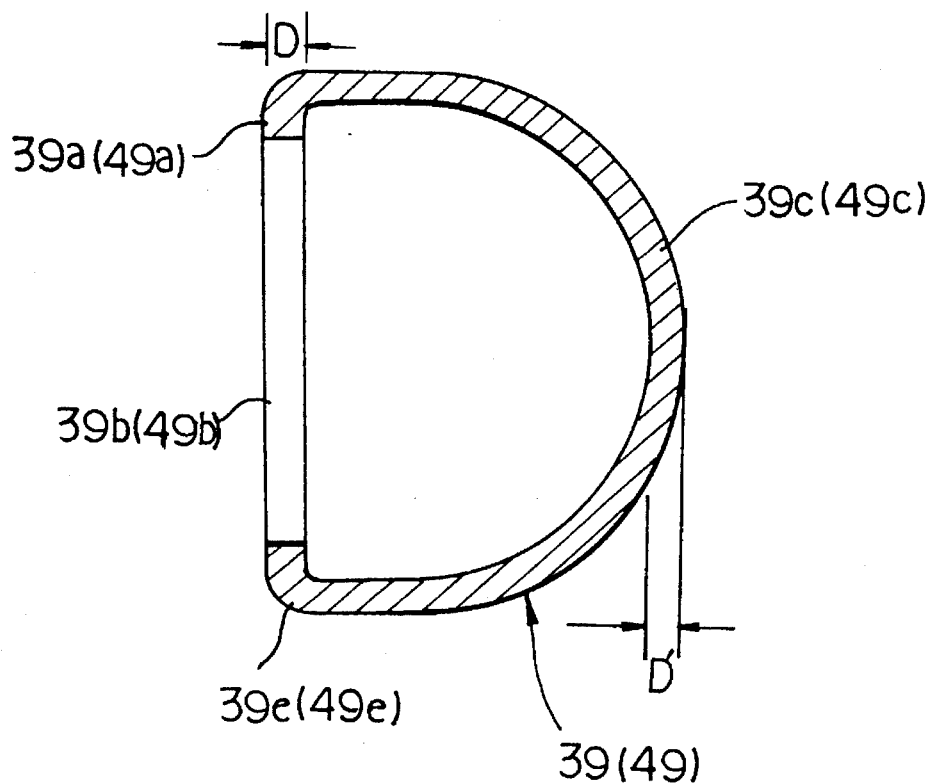
FIG. 3 is a cross sectional view of a header pipe of the heat exchanger taken along the section line A—A of FIG. 1.

As shown in FIG. 3, each of the header pipes 39 and 40 is manufactured by an extrusion of an aluminum material such that it has a generally D-shaped cross section and integrally comprises the flat section 39a, 49a and a rounded section 39c, 49c. Hence, neither of the first and second header pipes 39 and 40 has a brazed joint differently from the prior art cylindrical header pipe. The opposite open ends of each header pipe 39, 40 are liquid-tightly blocked by their respective caps, that is, top and bottom caps 43a and 43b, 51a and 51b. The rounded sections 39c and 40c of the header pipes 39 and 40 are provided with through holes 39d and 40d respectively. The through holes 39d and 40d of the header pipes 39 and 40 are liquid-tightly coupled to a refrigerant inlet nipple 45 and a refrigerant outlet nipple 55 respectively. The tube receiving apertures 39b and 40b formed on the flat sections 39a and 40a of the header pipes 39 and 40 are lengthwise spaced out at regular intervals and receive their respective ends of the tubes 31, thus to arrange the tubes in parallel.

On the other hand, the thickness D of each of the flat sections 39 and 40a of the header pipes 39 and 40 is thicker than that D' of a corresponding rounded section 39b, 40b. The flat section thicker than the rounded section of each header pipe not only increases the brazing contact area between the flat section of the header pipe and the ends of the tubes 31 when inserting the tubes into the tube receiving apertures of the flat section but also prevents deformation of the header pipe due to inner pressure of the header pipe.

Figure 5:
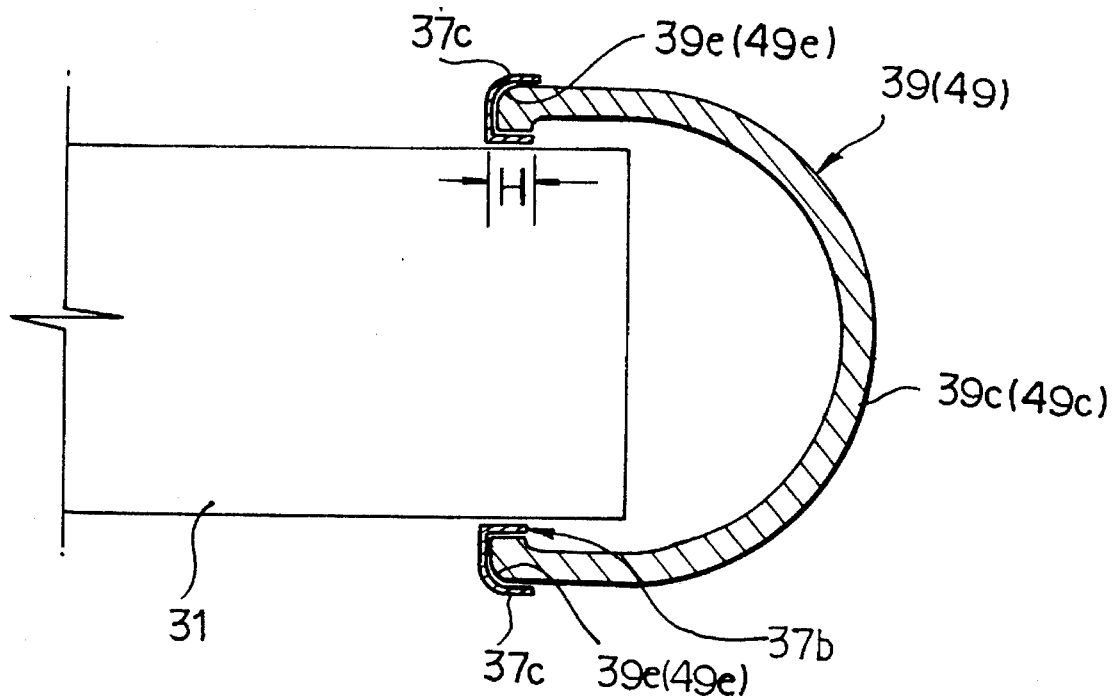
FIG. 5 is an enlarged sectional view showing a state in which a tube is inserted into the header pipe with interposition of the brazing metal plate before brazing.
Figure 6:
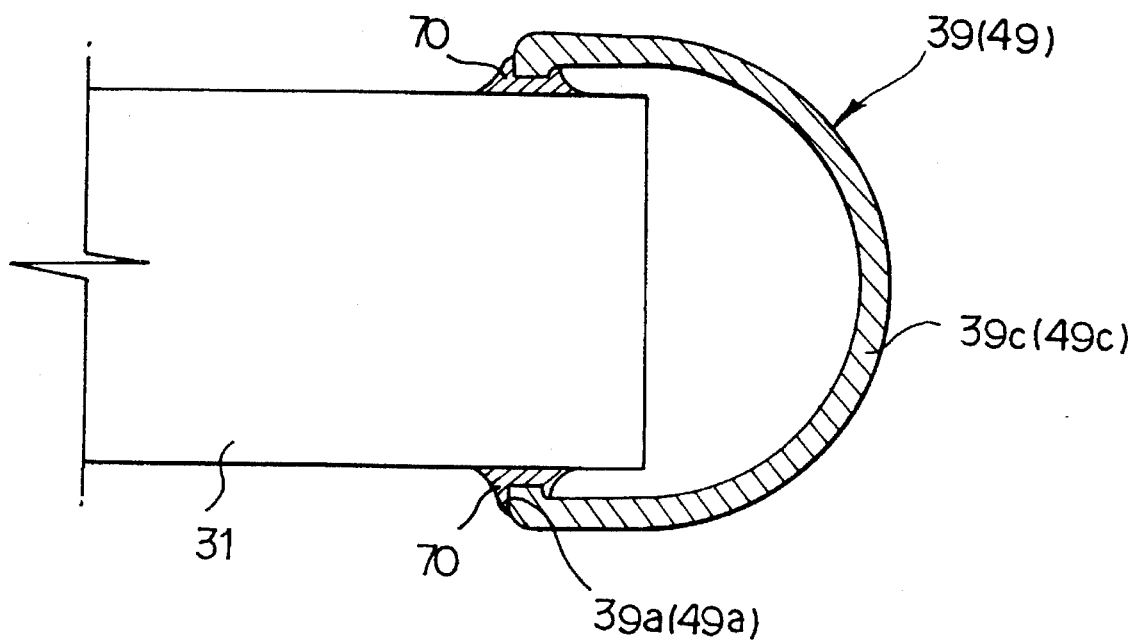
FIG. 6 is an enlarged sectional view showing a state in which the tube is inserted into the header pipe with interposition of the brazing metal plate after brazing.

FIG. 5 shows a state wherein a tube 31 is inserted into one of the header pipes 39 and 40 with interposition of a corresponding brazing metal plate 37 before brazing. As shown in this drawing, the brazing metal plate 37 having a c-shaped cross section is interposed between ends of the plurality of tubes 31 and the corresponding header pipe 39, 40. When the brazing metal plate 37 is heated by high temperatures of 580° C. –620° C. in a brazing furnace, it is melted and forms a brazing bead 70 as shown in FIG 6. In order to liquid-tightly joint the tubes 31 to the header pipes 39 and 40, each of the brazing metal plates 37 is made of an aluminum thin plate of a thickness ranged from 0.1 mm–1.0 mm.

Figure 4:
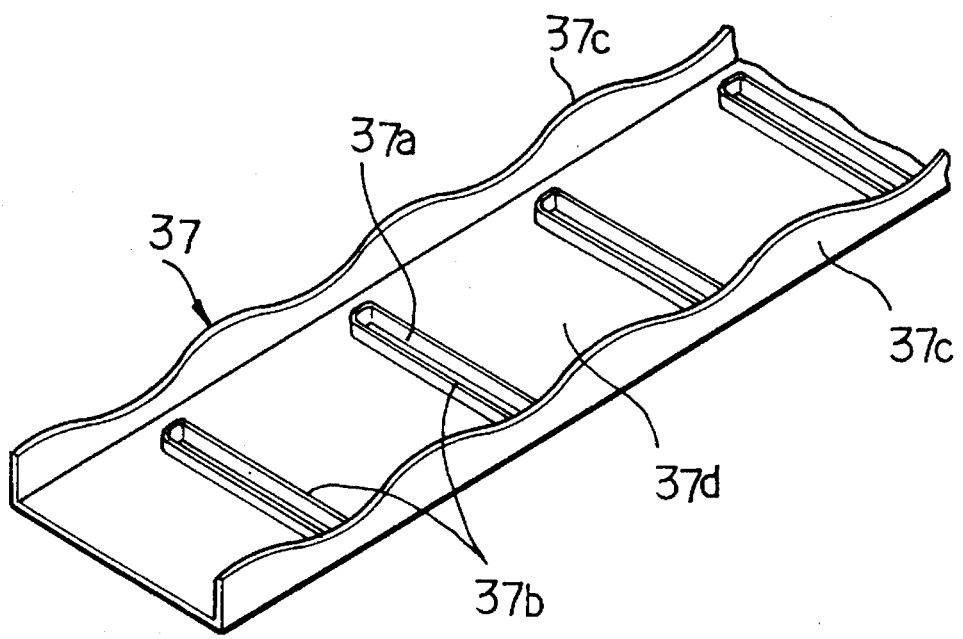
FIG. 4 is an enlarged perspective view of the brazing metal plate of the heat exchanger of FIG. 1.

As best seen in FIG. 4, each brazing metal plate 37 is provided on its flat section 37d with the plurality of slits 37a which are lengthwise spaced out at the same interval as that of the tube receiving apertures of the header pipe 39, 40. The interval between the slits 37a of the brazing metal plate 37 is also equal to the interval between the tubes 31 which are spaced out in order to be parallel to each other. A burr 37b is formed about each of the slits 37a of the brazing metal plate 37. The thickness of the burr 37b is not thinner than that D of the tube receiving apertures of the header pipe. That is, each of the slits 37a of the brazing metal plate 37 is provided with the burr 37b of which the height H is not less than the thickness D of the flat section of the header pipe as shown in FIG. 5.

The opposite sides of the brazing metal plate 37 is respectively provided with side flanges 37c which vertically extend from the flat section 37d of the plate 37. The side flanges 37c of the brazing metal plate 37 cover corners 39e, 49e of the header pipe when the plate 37 is brought into engagement with the flat section 39a, 40a of the header pipe as shown in FIG. 5.

Figure 7:
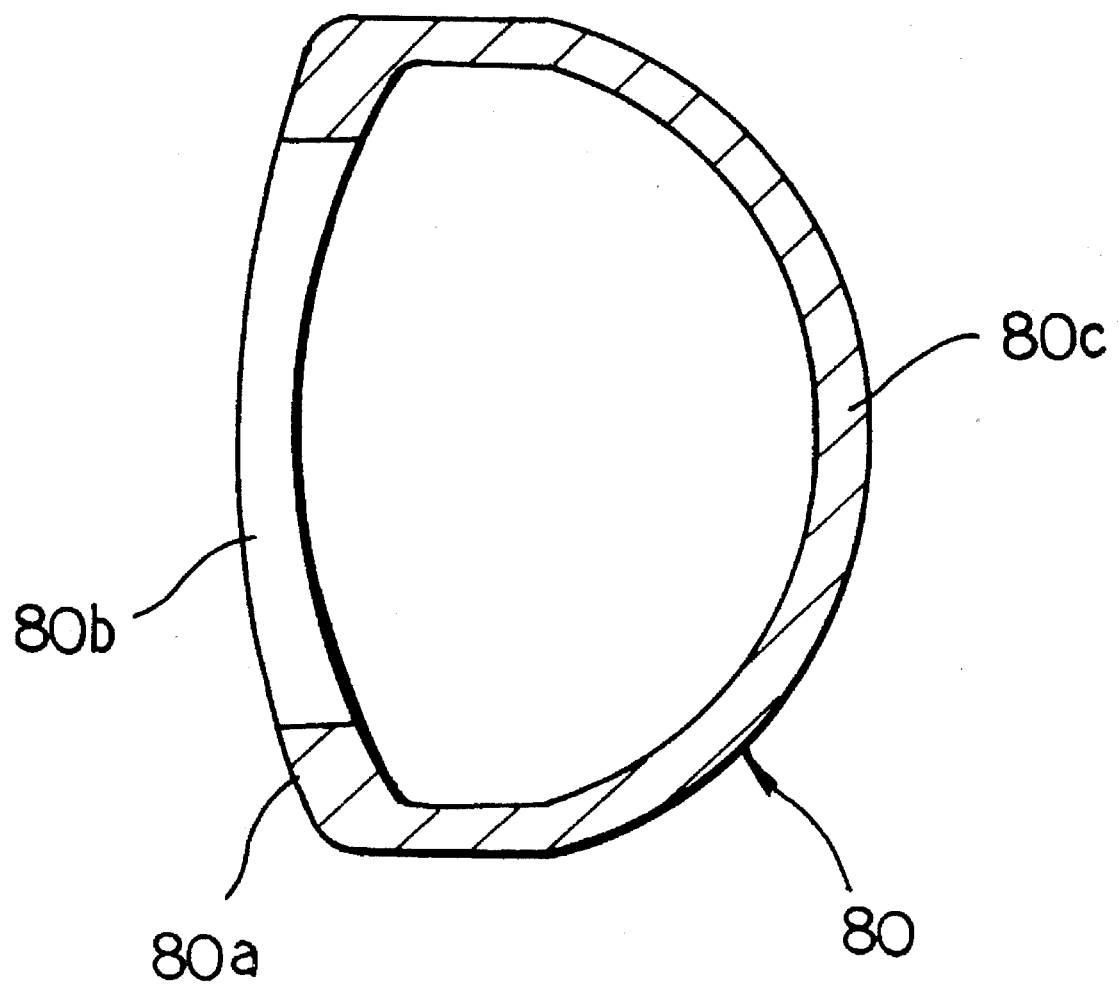
FIG. 7 is an enlarged cross sectional view of a header pipe of a heat exchanger in accordance with another embodiment of the present invention.

FIG. 7 shows a header pipe 80 of a heat exchanger in accordance with another embodiment of the present invention. This header pipe 80 includes a slightly rounded section 80a instead of the flat section 39a, 40a of the header pipe 39, 40 of the primary embodiment shown in FIGS. 1 to 3 in order to prevent its deformation due to refrigerant pressure. The slightly rounded section 80a of the header pipe 80 is provided with a plurality of tube receiving apertures 80b which are lengthwise spaced out at regular intervals. In the same manner as described for the primary embodiment, the thickness of the slightly rounded section 80a of the header pipe 80 is thicker than that of a rounded section 80c . Hence, the thicker and slightly rounded section 80a not only increases the brazing contact area between the section 80a of the header pipe 80 and the ends of the tubes 31 when inserting the tubes 31 into the tube receiving apertures 80b of the section 80a but also prevents deformation of the header pipe 80 due to the inner pressure of the header pipe 80.

The above heat exchanger, for example, according to the primary embodiment of the present invention is manufactured by the following method.

The header pipes 39 and 40 having the D-shaped cross section are prepared by a conventional extrusion and cut out into a predetermined length. Each of the header pipes 39 and 40 are, thereafter, pressed at its flat section 39a, 40a in order to be provided with the tube receiving apertures 39b, 40b lengthwise spaced out at the regular intervals. In addition, the header pipes 39 and 40 are provided at about ends of their rounded sections 39c and 40c with the through holes 39d and 40d for receiving their respective nipples 45 and 55. That is, the rounded section 39c of the first header pipe 39 is pressed at its upper portion in order to be provided with the through hole 39d to which the refrigerant inlet nipple 45 will be coupled. The rounded section 40c of the second header pipe 40 is pressed at its lower portion in order to be provided with the through hole 40d to which the refrigerant outlet nipple 55 will be coupled.

Thereafter, the opposite open ends of each header pipe 39, 40 are liquid-tightly blocked by top and bottom caps 43a and 43b, 51a and 51b, respectively. The refrigerant inlet nipple 45 and the refrigerant outlet nipple 55 are inserted into and coupled to the through holes 39d and 49d formed on the rounded sections 39c and 40c of the first and second header pipes 39 and 40, respectively. The first and second header pipes 39 and 40, each having the top and bottom caps and respectively having the refrigerant inlet nipple 45 and the refrigerant outlet nipple 55, are treated to a brazing, thus to liquid-tightly joint the caps and the nipples thereto.

The brazing of the first and second header pipes 39 and 40 are followed by coupling of the brazing metals plates 37 to the first and second header pipes 39 and 40. That is, the burrs 37b formed by pressing about the slits 37a of brazing metal plates 37 are inserted into their respective apertures 39b and 49b formed on the flat sections 39a and 40a of the header pipes 39 and 40, thereby coupling the brazing metal plates 37 to their respective header pipes 39 and 40. At this time, the side flanges 37c of the plates 37 cover the corners 39e and 40e of the header pipes 39 and 40 as shown in FIG. 5.

Thereafter, the plurality of tubes 31 for guiding the flow of refrigerant are arranged such that they are spaced out at the regular intervals and parallel to each other. The corrugated fins 33 are, thereafter, densely sandwiched between the tubes 31. Top and bottom support beams 35a and 35b are fixed to the uppermost corrugated fin 33 and the lowermost corrugated fin 33 respectively, thus to provisionally assemble a heat exchanger core.

The opposite ends of the plurality of the tubes 31 of the provisionally assembled core are, thereafter, respectively inserted into the slits 37a of the brazing metal plates 37 coupled to the first and second header pipes 39 and 40, thus to provide a provisionally assembled heat exchanger of which the joints are not still brazed.

The provisionally assembled heat exchanger is placed in the brazing furnace and heated at high temperatures of 580° C–620° C. As a result of the high temperature heating in the brazing furnace, the brazing metal plates 37, which are placed between the first arid second header pipes 39 and 40, the plurality of tubes 31 and the top and bottom support beams 35a and 35b, are melted to form the brazing beads 70 as shown in FIG. 6. Thus, the joints between the plurality of tubes 31, the header pipes 39 and 40 and the top and bottom support beams 35a and 35b are brazed, thus to liquid-tightly joint the elements of the heat exchanger to each other.

In the above description, the brazing of the top and bottom caps 43a, 43b, 51a and 51b and of the nipples 45 and 55 to the first and second header pipes 39 and 40 are separately carried out from the brazing of the provisionally assembled heat exchanger core to the header pipes 39 and 40. That is, after the brazing of the first and second header pipes 39 and 40, the opposite ends of the plurality of tubes 31 as well as opposite ends of the top and bottom support beams 35a and 35b are brazed and liquid-tightly jointed to the first and second header pipes 39 and 40 with interposition of the brazing metal plates 37 respectively. However, it is apparent that the method of the present invention is not limited to the above description. That is, the brazing of the top and bottom caps 43a, 43b, 51a and 51b and of the nipples 45 and 55 to the first and second header pipes 39 and 40 may be carried out at the same time of the brazing of the provisionally assembled heat exchanger core to the header pipes 39 and 40.

Hereinafter, the operational effect of the above heat exchanger will be described.

As described above, the first and second header pipes 39 and 40 of the heat exchanger of this invention are provided at their flat sections 39a and 40a with the plurality of apertures 39b and 49b which are lengthwise spaced out at regular intervals and will receive the plural icy of tubes 31. Opposite ends of the tubes 31 are inserted into the apertures 39a and 40a of the header pipes with interposition of the brazing metal plates 37 made of aluminum thin plates therebetween, thus to provide the provisionally assembled heat exchanger. This provisionally assembled heat exchanger is, thereafter, placed in the brazing furnace wherein it is heated at the high temperatures of 580° C.–620° C. in order to melt the brazing metal plates 37 and to form the brazing beads 70. Hence, the joints between the tubes 31, the top and bottom support beams 35a and 35b and the header pipes 39 and 40 are brazed and the desired liquid-tight joint of the elements of the heat exchanger is achieved. In this regard, there is no possibility of refrigerant leakage through the joints between the tubes 31 and the header pipes 39 and 40.

In addition, the heat exchanger of this invention is manufactured at once in such a manner that the plurality of tubes 31, the top and bottom support beams 35a and 35b and the plurality of corrugated fins 33 sandwiched between the tubes 31 and between the uppermost and lowermost tubes 31 and the top and bottom support beams 35a and 35b are provisionally coupled to the first and second header pipes 39 and 40, thus to be assembled into the provisionally assembled heat exchanger. The provisionally assembled heat exchanger is, thereafter, placed in the brazing furnace and heated in order to melt the brazing metal plates 37 made of aluminum and manufacture the desired heat exchanger. In this regard, the heat exchanger manufacturing method of this invention remarkably reduces the manufacturing time as well as the manufacturing cost.

As described above, a pair of header pipes of a heat exchanger of this invention are prepared by an extrusion and have a D-shaped cross section having no brazed joint Opposite ends of a plurality of tubes and opposite ends of top and bottom support beams are inserted to the pair of header pipes with interposition of a pair of brazing metal plates made of aluminum, thus to provide a provisionally assembled heat exchanger. The provisionally assembled heat exchanger is, thereafter, placed in a brazing furnace and heated at high temperatures of 580° C.–620° C., thus to melt the brazing metal plates and to form brazing beads. The brazing beads liquid-tightly braze the joints between the elements of the heat exchanger at once. In this regard, there is no refrigerant leakage through the joints between the elements of the heat exchanger of this invention. In addition, when punching the tube receiving apertures on flat sections of the header pipes of the heat exchanger of this invention, it is possible to prevent burst as well as deformation of the header pipes. Another advantage of the present invention is resided in that it is easily manufactured by a simple process, thereby remarkably reducing the manufacturing time as well as manufacturing cost.

Having described specified preferred embodiments of the invention with reference to the accompanying drawings, it is to be understood that the invention is not limited to those precise embodiments, and the various changes and modifications may be effected therein by one skilled in the art without departing from the scope of the invention as defined in the appended claims.

What is claimed is:

1. A method for manufacture of a heat exchanger for an automobile air conditioning system comprising the steps of:

provisionally inserting opposite ends of a plurality of refrigerant flowing tubes into their respective apertures of first and second D-shaped cross-sectioned header pipes with interposition of a pair of brazing metal plates between them each plate including at least one flanged portion which extends from a body portion of the plate and overlaps with a portion of a respective header pipe, and provisionally coupling opposite ends of top and bottom support beams to said first and second header pipes with interposition of said brazing metal plates, thus to form a provisionally assembled heat exchanger; and heating said provisionally assembled heat exchanger in a brazing furnace at a high temperature so as to melt said brazing metal plates and to form a plurality of brazing beads for liquid-tightly jointing said tubes to said header pipes such that said header pipes communicate with each other through the tubes and for jointing said top and bottom support beams to said header pipes.

2. The method according to claim 1, wherein each of said header pipes is a hollow solid body with no joint produced by an extrusion of an aluminum material.

3. The method according to claim 1, wherein said high temperature at which said provisionally assembled heat exchanger is heated in order to form said brazing beads is ranged from 580° C.–620° C.

4. The method according to claim 1, wherein each of said brazing metal plates is an aluminum thin plate of a thickness of 0.1 mm–1.0 mm.

* * * * *